3,149,016
NUCLEATED GLASS PARTICLE AND PROCESS FOR MAKING IT

Chi Fang Tung, Lincoln Township, Washington County, and Warren R. Beck, Mahtomedi, Minn., assignors to Minnesota Mining and Manufacturing Company, St. Paul, Minn., a corporation of Delaware
No Drawing. Filed Apr. 2, 1962, Ser. No. 184,547
5 Claims. (Cl. 161—1)

This invention relates to our discovery that the refractive index ($n_D$) of glass beads may be elevated above that originally exhibited by the glass beads when the beads are subjected to a specialized heat treatment. More particularly, the invention relates to methods for elevating the refractive index of transparent glass beads and to the resulting glassy transparent beads as new and novel articles of manufacture.

It is believed that the increase in refractive index of glass beads as accomplished according to this invention is not due to well-known phenomena in the glass industry such as strain-relieving and the like, but instead is largely due to a nucleation of rearrangement of structural units short of the formation of crystals of sufficient size to cause light scattering and opacification.

Glass beads treated according to the invention are particularly useful in reflex-reflecting structures and compositions. Of significance is the fact that, by following the teachings herein, it is possible to increase the refractive index of glass beads sufficiently to cause up to a doubling of the reflex-reflecting capacity of reflex-reflecting structures of which they are a part.

It should be recognized, however, that the increase of refractive index accomplished by the invention may be of a relatively low order of magnitude over that of the original glass bead. Indeed, increases in refractive index as small as 0.03 are sometimes found to provide for significant improvement in the reflex-reflecting performance of structures of which they are a part. But it is usually true that the refractive index will be increased by at least about 0.05 or more over the refractive index of the original glass beads subjected to treatment, particularly where the greatest benefits of the invention are to be realized.

As an outstanding example of the increase possible according to the invention, we have been successful in converting glass beads having an original refractive index of about 2.47 to a final refractive index of about 2.7. Indeed, the nature of our discovery is such that it is possible to increase the index of glass beads to a varying extent depending, of course, upon the particular composition of the original glass and the maximum increase of refractive index capable of being effected by optimum use of the teachings herein.

By controlling the extent of increase in refractive index, we have also found it is possible to control, to some extent, the color of light reflex-reflected through the transparent beads of our invention when they are used in reflex-reflecting structures.

Contrary to prior experience in the glass art, we have found that it is possible to heat treat transparent glass beads at significantly elevated temperatures without causing devitrification or opacification. It has heretofore generally been understood that temperatures of heat treatment for glass beads above temperatures where opacification of the beads occurs (which incidentally is also above annealing temperatures) could only be expected to cause nothing more than greater opacification or devitrification of the glass of the beads. Contrary to this understanding among glass technologists, we have learned that, by rapidly heating glass beads to a temperature above the glass transition temperature where opacification occurs, it is possible to avoid opacification or devitrification and thereby preserve transparency while at the same time causing a slight nucleation or rearrangement of structural units sufficient to significantly increase the refractive index of the resulting glassy transparent beads.

The temperatures required for heat treatment are in excess of those used for conventional annealing treatments. Spcifically, we feel that the temperature required for our treatment should, essentially without exception, be at least above 450° C., and preferably above 550° C. Under any circumstances, it will be above the annealing temperature conventionally used for glasses of the composition undergoing treatment. Indeed, it will be above the temperature at which the glass starts to undergo opacification. For the glasses contemplated herein, such a temperature is near the upper reaches of temperature for annealing.

The upper limit of temperature for our heat treatment will usually not exceed approximately 1000° C. or possibly sometimes 1100° C., but in any event will be at least about 300° C. below the liquidus temperature of the particular glass undergoing treatment. The objective of the heat treatment is to reach a temperature at which nucleation occurs in the glass undergoing treatment; but the temperature of treatment, if so high as to reach the temperature of optimum nucleation for the glass undergoing treatment, will be maintained for only a limited time so as to prevent excessive crystallization and opacification. Indeed, while nucleation is an accomplished fact in the final heat-treated glass article, true crystallization of its components is not in fact accomplished since crystallization causes the glass to become opaque.

Despite the fact that the formation of true crystals is undesired in our glass treatment, it is critically necessary that the composition of the particular beads undergoing treatment include at least 25% by weight of crystallizable glassforming constituents. By this we mean that the glass composition of the glass beads undergoing treatment must include crystallizable inorganic oxides in an amount sufficient to account for at least 25% of their weight. These crystallizable glassforming oxides are not necessarily the popular glassforming oxides such as silicon dioxide, germanium dioxide, boron oxide, and phosphorus oxide or the like. In fact, the crystallizable glassfroming inorganic oxide components, as the same are referred to herein, are generally of the highly refractory type which, according to conventional glassforming practice, would not be considered a popular type of glassforming oxide. They are refractory and characteristically are not formed into glass except in the presence of other oxides which give a total composition capable of being formed into glass. It should be noted however that highly refractory crystallizable glassforming oxides are not the only type of crystallizable glassforming oxides useful in the practice of the invention. Example 2 in the table below illustrates that the critical concept is that of employing crystallizable glassforming oxides to an extent of at least 25% by weight, as pointed out above, with less than 25% by weight of highly refractory crystallizable glassforming oxide present in that composition.

EXAMPLE 1

As a specific example of the increase of refractive index of glass beads according to the practice of this invention, a batch of glass beads, formed from glass consisting of 67.5 parts by weight of lead oxide and 32.5 parts by weight of titanium dioxide, having a refractive index of 2.47 and a diameter between about 1 and 3 mils, were subjected rapidly to a temperature between approximately 600° C. and 800° C. for about 10 minutes. This is suitably accomplished by passing the beads directly from room temperature conditions into a furnace held at about 650° C. In the furnace, the beads rapidly reached about 600–650° C. and then, as a result of exothermic action within the beads, they became further elevated in temperature by 50° C. or so, to a temperature higher than the furnace temperature itself. After about 10 minutes, they were removed and placed under room temperature conditions, to allow rapid cooling to room temperature. The so-treated beads exhibited a final refractive index of 2.70. If an increase of refractive index from 2.47 to about 2.65 is desired for the composition, the time of treatment and/or the temperature of treatment should be decreased; but a temperature at least sufficient to initiate an exothermic reaction within the glass must be used. For the glass of this example, a temperature above about 600° C. is required to initiate the change of structure to cause increase in refractive index. A few experiments may be necessary to arrive at the exact time and temperature conditions giving a desired end refractive index of 2.65 for the composition of the beads of this example; but such experiments may readily be conducted using the principles set forth herein.

The composition of the glass of this example exhibited a liquidus temperature of about 1200° C. If glass of this composition is heated to about 550° C. and maintained at that temperature for any significant length of time, it will become opaque. This result is because the temperature employed (e.g., about 550° C.) is toward the upper limit of the annealing temperature for this glass and within the temperature range where the glass undergoes transition to a crystalline and opaque state. Surprisingly, by rapidly heating this glass composition to a temperature above its temperature of transition to an opaque and crystalline state, and even when this glass composition is held at such elevated temperature for lengths of time up to an hour or even possibly slightly longer, transparency of the glass is not lost and the formation of a truly crystalline structure is not accomplished. Instead, just sufficient nucleation and/or alteration of the structural units of the glass occurs to effect a striking increase in the refractive index thereof without altering the transparency of the glass.

While striking results are particularly obtained when a content of titanium dioxide above about 25% by weight is present in the composition of glasses to be treated according to the instant invention (as is particularly illustrated by the foregoing example as well as many of the examples of the table below), it is particularly noteworthy that Example 2 in the table below contains no titanium dioxide and contains very little of the refractory oxide, $SiO_2$. Yet the refractive index of the composition of Example 2 was increased by the heat treatment specified in the table from 2.242 to 2.396, an increase of 0.154.

The liquidus temperature for the composition of Example 2 below is on the order of 900° C. to 1000° C., whereas the other examples recited in the table have a liquidus temperature above about 1200° C. The transition temperature for Example 2 below is rather difficult to detect inasmuch as it does not exhibit a pronounced tendency to alter its structure into a crystalline state at temperatures toward the upper limits of its annealing range; but the composition of Example 2 does tend to form itself into crystals if maintained at a temperature around 400–450° C. for a great length of time. The transition temperature (i.e., the temperature at which opacification occurs on heating) for the other examples in the table below is between about 500° C. to 800° C., and in each case it is at least several degrees centigrade below the temperature of heat treatment specified.

An interesting observation worth noting here is that the temperature for heat treatment according to this invention falls generally within the range of temperature between about one-third and two-thirds of the liquidus temperature for the glass undergoing treatment. Also, it has been noted that the heat treatment, with effective and significant increase in refractive index, is accompanied by an exothermic reaction within the glass, which reaction is triggered by the temperature to which the glass is subjected during the heat treatment. As a result of the exothermic action, the temperature of the glass is further elevated (e.g., at least 10° C. and up to about 100° C.) beyond that to which it was raised by external application of heat. Cooling during the time the exotherm is in effect is difficult to accomplish with any confidence that all glass beads have reached the exotherm and are thereby being converted to exhibit a higher index of refraction. Nevertheless, such early cooling may be used to reduce the extent of increase of refractive index, where it is desired to do so.

While we describe our invention with particular reference to transparent glassy beads, it will be recognized that it has applicability to other shapes for glass elements, preferably no larger than about 2 mm. in size. Where glass beads for reflex-reflecting applications are treated, they generally will be no larger than about 10 mils in diameter.

Improvements as imparted to glass according to this invention are more pronounced when glass having a composition which originally exhibited a refractive index above about 2.0 is used. The availability of existing glasses having refractive indices below 2.0 and even to some extent above 2.0 makes it apparent that the major benefits of the invention are more pronounced when glasses of already high refractive index are converted to an even higher refractive index heretofore not recognized as being possible.

*Table 1*

| Example | 2 | 3 | 4 | 5 | 6 | 7 | 8 | 9 | 10 |
|---|---|---|---|---|---|---|---|---|---|
| PbO* | 92.5 | | | | | | | 70 | 47 |
| $TiO_2$ | | 57.5 | 60 | 60 | 70 | 70 | 70 | 30 | 33 |
| $SiO_2$ | 7.5 | | | | | | | | |
| BaO | | 42.5 | | | | | | | 12.9 |
| $ZrO_2$ | | | 40 | | 3 | 15 | 15 | | |
| SrO | | | | 40 | 27 | 15 | 15 | | |
| $Rb_2O$ | | | | | | 2 | | | |
| $Cs_2O$ | | | | | | | 1 | | |
| ZnO | | | | | | | | | 4.1 |
| $B_2O_3$ | | | | | | | | | 3.0 |
| (a) | 2.242 | 2.202 | 2.291 | 2.176 | 2.27 | 2.325 | 2.33 | 2.35 | 2.286 |
| (b) | 500 | 850 | 900 | 750 | 900 | 900 | 900 | 750 | 650 |
| (c) | 30 | 30 | 30 | 30 | 30 | 30 | 30 | 60 | 60 |
| (d) | 2.396 | 2.314 | 2.396 | 2.36 | 2.38 | 2.55 | 2.56 | 2.56 | 2.401 |

*Amounts of ingredients are in parts by weight.

(a) Original refractive index prior to heat treatment hereof.
(b) Temperature of heat treatment in degrees C.
(c) Time of heat treatment in minutes.
(d) Refractive index after heat treatment hereof.

That which is claimed is:

1. The process for increasing the refractive index of transparent glass particles no larger than about 2 mm., having a composition containing at least 25% by weight of crystallizable glassforming constituents, said process comprising subjecting said transparent glass particles for at least about one minute up to about one hour to a temperature between 450 and 1100° C., the specific temperature selected for said heat treatment being at least 300° C. below the liquidus temperature of the glass of said particles undergoing treatment and being at least sufficient to cause the glass undergoing treatment to undergo an exothermic change elevating it at least about 10° C. above its temperature prior to said exothermic change thereby to effect nucleation of the glass of said particles.

2. Nucleated transparent glassy particles formed by the process of claim 1 having an increase of refractive index of at least 0.03 over the refractive index of said particles prior to the treatment specified in claim 1.

3. Nucleated transparent glassy particles formed by the process of claim 1 having an increase of refractive index of at least 0.1 over the refractive index of said particles prior to the treatment specified in claim 1.

4. The process for increasing the refractive index of transparent glass beads no larger than 10 mils in diameter, having a composition containing at least 25% by weight of crystallizable glassforming constituents, said process comprising subjecting said transparent glass beads for at least about one minute up to about one hour to a temperature between 450 and 1100° C., the specific temperature selected for said heat treatment being at least 300° C. below the liquidus temperature of the glass of said beads undergoing treatment and being at least sufficient to cause the glass undergoing treatment to undergo an exothermic change elevating it at least about 10° C. above its temperature prior to said exothermic change thereby to effect nucleation of the glass of said particles.

5. The process of claim 4 wherein titanium dioxide accounts for at least 25% of the crystallizable glassforming constituents of the composition of the glass beads.

References Cited in the file of this patent

UNITED STATES PATENTS

| | | |
|---|---|---|
| 2,713,286 | Taylor | July 19, 1955 |
| 2,870,030 | Stradley et al. | Jan. 20, 1959 |
| 2,998,675 | Olcott et al. | Sept. 5, 1961 |
| 3,041,191 | D'Adrain | June 26, 1962 |
| 3,054,139 | Bartholomew et al. | Sept. 18, 1962 |